US006994070B2

(12) United States Patent
Taomo et al.

(10) Patent No.: US 6,994,070 B2
(45) Date of Patent: Feb. 7, 2006

(54) PORTABLE AIR BLOWING WORKING MACHINE

(75) Inventors: Toshio Taomo, Tokyo (JP); Tadashi Kamoshita, Tokyo (JP); Hiroaki Koga, Saitama (JP); Giichi Iida, Tokyo (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 10/819,327

(22) Filed: Apr. 5, 2004

(65) Prior Publication Data

US 2004/0216262 A1 Nov. 4, 2004

(30) Foreign Application Priority Data

Apr. 8, 2003 (JP) ............................ 2003-104183

(51) Int. Cl.
*F02B 77/00* (2006.01)

(52) U.S. Cl. .................................... 123/198 E; 55/383

(58) Field of Classification Search ............ 123/198 E, 123/41.56, 41.7; 55/383, DIG. 28
See application file for complete search history.

(56) References Cited

U.S. PATENT DOCUMENTS

| | | | |
|---|---|---|---|
| 5,052,073 A | 10/1991 | Iida | 15/327 |
| 5,241,932 A * | 9/1993 | Everts | 123/195 R |
| 5,526,777 A | 6/1996 | Taomo et al. | 123/41.65 |
| 6,378,467 B1 * | 4/2002 | Kobayashi et al. | 123/41.56 |

* cited by examiner

*Primary Examiner*—Noah P. Kamen
(74) *Attorney, Agent, or Firm*—Baker Botts L.L.P.

(57) ABSTRACT

There is provided a portable air blowing working machine capable of obviating frequent operation for the maintenance of air cleaner and hence capable of improving working efficiency. This working machine includes an internal combustion engine having the air cleaner disposed in the air-intake system thereof, and an air blower to be rotationally driven by the engine; which is characterized in that the air cleaner is provided with a suction port for in drawing in external air, with a filter member for cleaning air drawn from the suction port to thereby permit the cleaned air to be introduced into the engine, and with a discharge port for enabling part of the air drawn from the suction port to be discharged out of the air cleaner without permitting part of the air to pass through the filter member; and that an air flow directed to flow from the suction port to the discharge port is permitted to generate inside the air cleaner by making use of the suction force of the air blower.

3 Claims, 5 Drawing Sheets

PRIOR ART

PORTABLE AIR BLOWING WORKING MACHINE

BACKGROUND OF THE INVENTION

1. Field of the Invention

The present invention relates to a portable air blowing working machine, and in particular, to a portable air blowing working machine (such as an air blowing cleaner which is designed to perform cleaning by collecting fallen leaves and refuse and a power sprayer which is designed to perform chemicals-spray working) which is designed to utilize an air flow (air blowing) injected from a blower which can be rotationally driven by an internal combustion engine such as an air-cooled two-stroke internal combustion engine having an air cleaner disposed in the air-intake system of the engine.

2. Description of the Related Art

FIG. 5 illustrates one example of a portable air blast cleaner representing the aforementioned portable air blowing working machine. Referring to FIG. 5, the portable air blowing cleaner 100 is of a back-pack type (see, for example, Utility Model Registration No. 2501215, pages 1–2, FIGS. 1–3) and is designed to gather fallen leaves and refuse by making use of the blowout of accelerated and pressurized air stream in place of using a broom. This portable air blowing cleaner 100 is constructed such that it comprises a back-pack frame 62 having a U-shaped configuration in plan view and provided with a couple of shouldering bands 64, a centrifugal type air blower 80 employed as an air blowing member and secured vertically through a vibration-damping member (not shown) to the back-pack frame 62, and an air-cooled two-stroke internal combustion engine 60 for rotatably driving the air blower 80, the internal combustion engine 60 being directly coupled to the rear side of the centrifugal type air blower 80 and supported by the back-pack frame 62.

The air blower 80 is constructed such that the suction port thereof (not shown in FIG. 5) is disposed to face a central portion of the back-pack frame 62 so as to enable external air to be inhaled through a space between the back-pack frame 62 and the volute case 83 thereof and that the air discharge port 85 thereof is attached to one end of the volute case 83 and extended therefrom obliquely downward so as to allow the external air that has been accelerated and pressurized to be discharged from the air blower 80. To this air discharge port 85, there are successively connected a bent pipe 91, a bellows-shaped flexible pipe 92 and an discharge pipe 95. This discharge pipe 95 is provided, at a proximal end portion thereof, with a control handle 96 furnished with a lever for operating a carburetor throttle valve of the engine 20 as well as with switches 97.

Over the top of the volute case 83 of the air blower 80, there is disposed an air cleaner 70 for cleaning the air to be introduced into the internal combustion engine 60. This air cleaner 70 is provided therein with a filter member so that the external air that has been drawn from a suction port 75 by the suction force (negative pressure) of internal combustion engine 60 can be cleaned (the removal of dust) by this filter member before the air is permitted to be introduced into the internal combustion engine 60.

Since it is generally unavoidable that the air cleaner positioned in the air intake system of the internal combustion engine is gradually clogged with dust, it is required to perform the maintenance thereof (the cleaning of the filter member, the replacement by a new filter member) at suitable intervals depending on the environments of use, operating time, etc. Namely, when the air blowing cleaner is employed in an environment where a large quantity of dust is generated, the maintenance of the air cleaner has to be performed quite frequently.

Under the circumstances, there have been conventionally proposed various measures to prolong the cycle time for performing such maintenance. For example, there is proposed a countermeasure wherein by making use of suction force (negative pressure) to be generated by the effect of the cooling fan of the internal combustion engine, an air flow passing along the outer surface of the filter member and being subsequently discharged out of the air cleaner is separately generated apart from the air flow to be introduced through the filter member into the intake port of the internal combustion engine, thereby making it possible to remove the dust clogging the filter member from the filter member (see, for example, Utility Model Registration No. 2595842, pages 1–3, FIGS. 1–6).

In the case of the portable air blowing working machine, in particular, the back-pack type air blowing cleaner illustrated above, due to the manner of operating the cleaner wherein the gathering work of fallen leaves and refuse is executed by the drifting of the fallen leaves and refuse that can be effected by the blowout of accelerated and pressurized air instead of using a broom, dust is inevitably permitted to be blown up by the effect of the blowout air and also permitted to intermingle with the air to be inhaled into the air cleaner. As a result, the clogging of the filter member may be caused to occur quite frequently, thus shortening the cycle time for the maintenance of the air cleaner and hence raising the problem that the working efficiency using the air blast cleaner is caused to deteriorate proportionally.

BRIEF SUMMARY OF THE INVENTION

The present invention has been made in view of the aforementioned problems, and therefore one of the objects of the present invention is to provide a portable air blowing working machine which is capable of obviating frequent operation for the maintenance of the air cleaner and hence is capable of improving its working efficiency.

With a view to realize the aforementioned object, the present invention provides a portable air blowing working machine which comprises an internal combustion engine having an air cleaner disposed in an air-intake system thereof, and an air blower to be rotationally driven by the internal combustion engine; which is characterized in that the air cleaner is provided with a suction port for inhaling (i.e., drawing) external air, with a filter member for cleaning air drawn from the suction port to thereby permit the cleaned air to be introduced into an intake port of the internal combustion engine, and with a discharge port for enabling part of the air that has been drawn from the suction port to be discharged out of the air cleaner without permitting the part of the air to pass through the filter member; and that the suction force to be generated by the fan of the air blower is utilized for generating an air flow inside said air cleaner, the air flow being directed to flow from the suction port to the discharge port.

According to a preferable embodiment, which further comprises a back-pack frame for vertically mounting the air blower, wherein an inlet port of the air blower is disposed to face the back-pack frame, the air cleaner is positioned over the air blower or the internal combustion engine, and the discharge port of the air cleaner is positioned closer to the back-pack frame than the location where the suction port is positioned.

According to another preferable embodiment, the back-pack frame is provided therein with an air passageway and with a duct for feeding part of the air that has been drawn into the air cleaner from the discharge port to the air passageway having openings located so as to approximately face the suction port of air blower.

Preferably, the air cleaner further comprises a base case to which the filter member is secured and to which a cleaned air-discharging port is attached; and a cap member which is detachably mounted on the base case, thereby permitting an air flow to generate in a space between the outer surface of the filter member and the inner surface of the cap member, the air flow being directed to flow from the suction port toward the discharge port.

In the portable air blowing working machine representing a preferable embodiment according to the present invention which is constructed as described above, when the internal combustion engine is actuated to start, external air is permitted to be drawn into the air cleaner from the suction port due to the effect of the suction force (negative pressure) of the internal combustion engine and of the air blower. The air (or most of the air) thus drawn is then cleaned by the filter member and discharged from the cleaned air-discharging port attached to the air cleaner, thus enabling the air to be introduced, via the intake duct, the carburetor and the intake port of the engine, into the crank chamber. The air-fuel mixture thus introduced into the crank chamber is permitted to enter, via the scavenging passageway, into the combustion chamber and explosively burnt in the combustion chamber by the ignition action thereof by means of the spark plug, the resultant combustion gas (exhaust gas) generated by the explosion of the air-fuel mixture being subsequently discharged from the exhaust gas port into external atmosphere.

Meanwhile, because an air flow that is permitted to flow from the suction port toward the discharge port is generated by the suction force (negative pressure) of the air blower fan, a portion of the air that is drawn into the air cleaner is prevented from passing through the filter member, and thus is separate from the cleaned air that is drawn into the internal combustion engine. The separated portion of air is discharged, together with dust adhered to the filter member, out of the air cleaner through the exhaust port. The air accompanying the dust and discharged out of the air cleaner is then attracted toward the suction port of the air blower by the suction force (negative pressure) of the fan of the air blower and permitted to enter into the volute case. After being accelerated and pressurized in the volute case, the air is blown out from the working machine through an air discharge port and an air discharge pipe.

According to the portable air blowing working machine of the present invention as described above, by making use of the suction force (negative pressure) of the fan of the air blower, an air flow which is prevented from passing through the filter member is generated separate from the air to be cleaned by the filter member and drawn into the internal combustion engine. By making use of this air flow, the dust clogging the filter member is removed from the filter member, the air flow accompanying the dust being subsequently drawn into the air blower and then discharged therefrom. As a result, it is possible to slow the progress of clogging of the filter member and hence to prolong the frequency of maintenance, thus making it possible to improve its working efficiency.

DETAILED DESCRIPTION OF THE INVENTION

The specific embodiments of the present invention will be explained below with reference to drawings.

Figure 1:
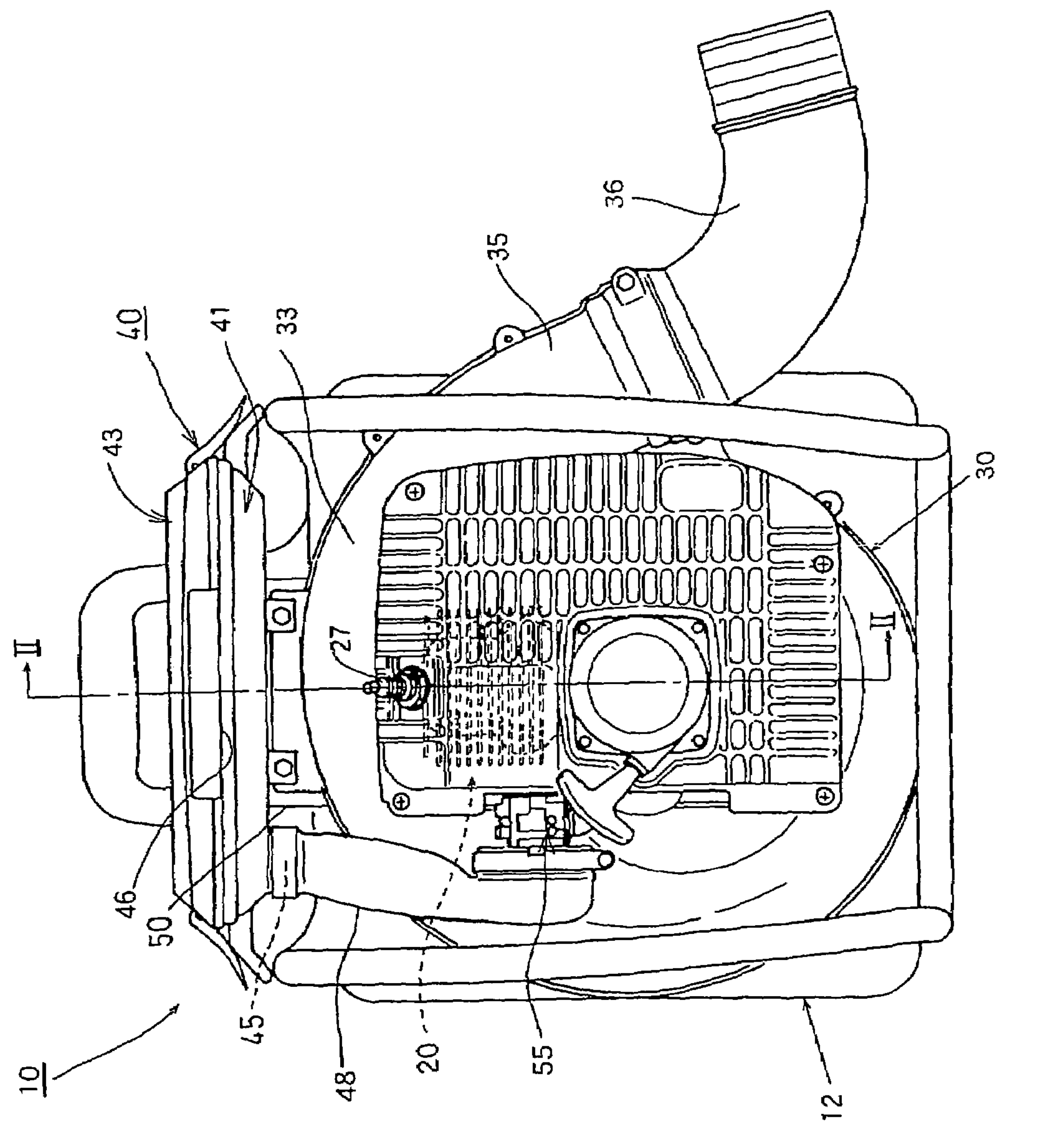
FIG. 1 is a rear side view of a back-pack type air blowing cleaner according to one embodiment of the present invention, which represents one of the portable air blowing working machines of the present invention.
Figure 2:
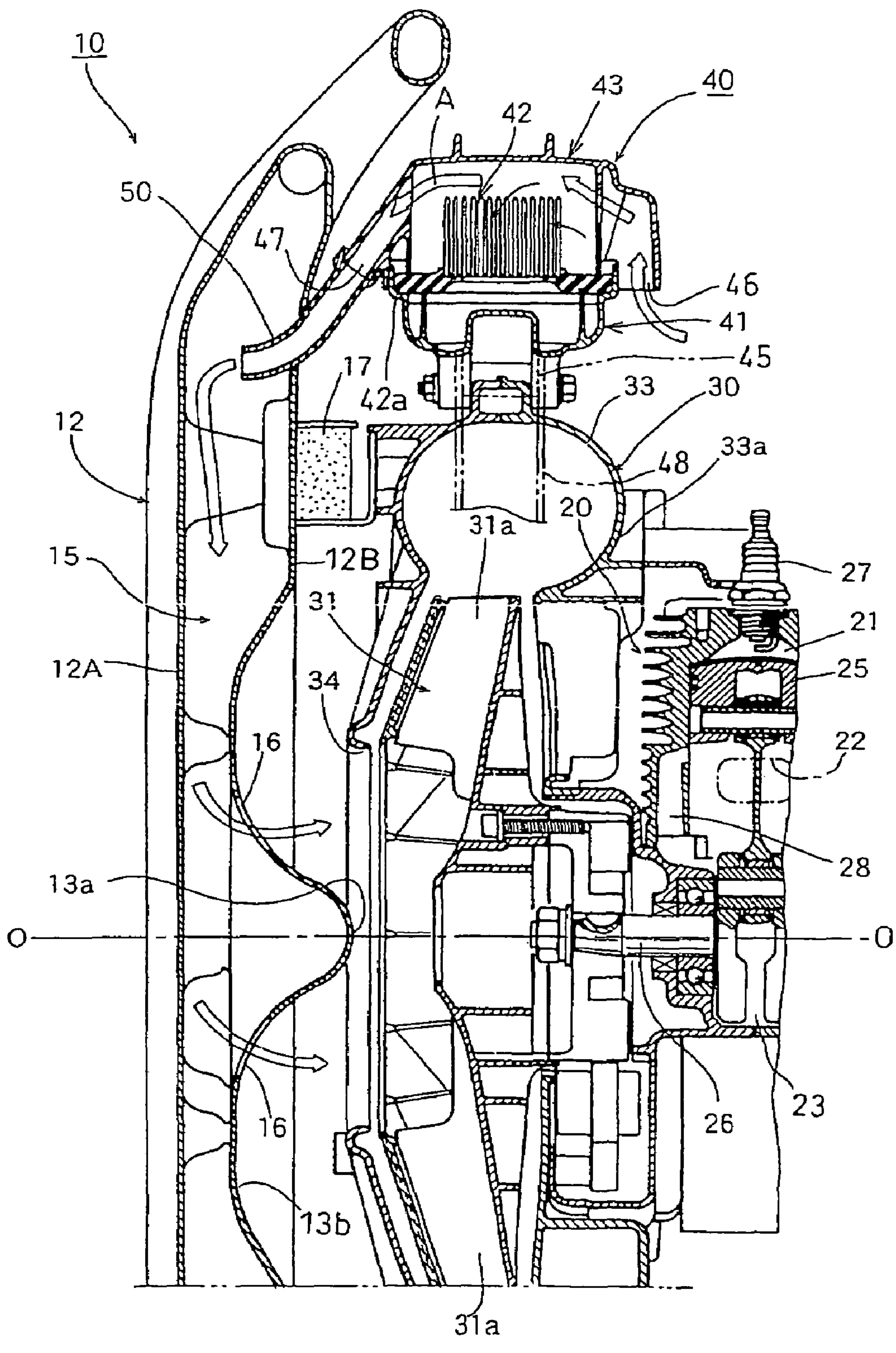
FIG. 2 is an enlarged cross-sectional view taken along the line II—II of FIG. 1.
Figure 5:
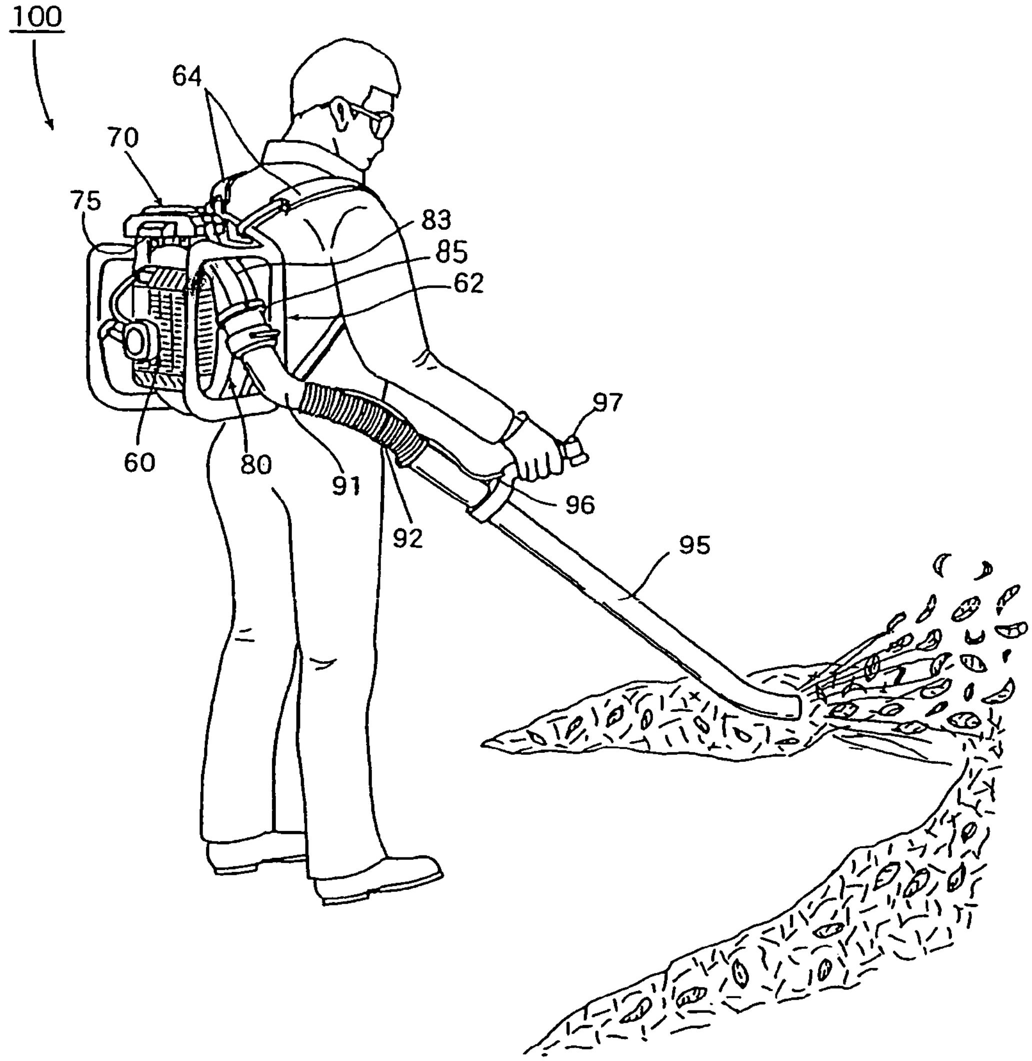
FIG. 5 is a perspective view schematically illustrating the manner of using a portable air blowing cleaner according to the prior art.

FIG. 1 shows a rear side view of a back-pack type air blowing cleaner according to one exemplary embodiment of the present invention, which represents one of the portable air blowing working machines of the present invention; and FIG. 2 shows an enlarged cross-sectional view taken along the line II—II of FIG. 1. The back-pack type air blowing cleaner 10 shown in this embodiment is fundamentally the same in construction as that of the conventional portable air blowing cleaner 100 shown in FIG. 5 and is designed to perform the work of gathering fallen leaves and refuse instead of using a broom.

This back-pack type air blowing cleaner 10 is constructed such that it includes a back-pack frame 12 having a couple of shouldering bands (not shown) attached thereto, and a centrifugal type air blower 30 which is secured through vibration-damping members 17 to the back-pack frame 12. This centrifugal type air blower 30 comprises a spiral volute case 33, and a fan 31 having a predetermined number of fan blades 31*a* which are arranged side by side on the same circumferential surface of the shaft of fan 31. By the fan 31, external air is drawn from a circular suction port 34 which is opened to face the back-pack frame 12 and then introduced into the volute case 33, through which the air is pressurized and accelerated, thereby enabling the air to be discharge from the distal end of an discharge pipe after passing through the air discharge port 35 which is attached to one end of the volute case 33 and extending obliquely downward and then through a bent pipe 36, a bellows-shaped flexible pipe and the discharge pipe (see FIG. 5).

An air-cooled two-stroke internal combustion engine 20 such as an internal combustion engine for rotatably driving the fan 31 of the air blower 30 is directly coupled to the front wall 33*a* of the volute case 33 of the air blower 30 (on the right side of FIG. 2) and sustained by the volute case 33. The internal combustion engine 20 is vertically disposed on the front wall 33*a* of the air blower 30 with the cylinder intake port 22 thereof being directed sideward, and at the same time, the crank shaft 26 of the engine 20 as well as the fan 31 of the air blower 30 are positioned coaxial with a common rotational axis O—O.

The engine 20 is provided with a combustion chamber 21 having a piston 25 inserted therein, and with a crank chamber 23, wherein the air cleaned by and fed from an air cleaner 40 disposed over the volute case 33 of the air blower 30 is permitted to enter, via an intake duct 48 and a carburetor 55, into the crank chamber 23 from the cylinder intake port 22. The air-fuel mixture thus introduced into the crank chamber 23 is permitted to enter, via the scavenging passageway 28, into the combustion chamber 21 and explosively burnt in the combustion chamber 21 by the ignition thereof by means of the spark plug 27, the resultant combustion gas (exhaust gas) generated by the explosion of the air-fuel mixture being subsequently discharged from the exhaust gas port (not shown) which is positioned on the opposite side of the intake port 22 into external atmosphere.

Figure 3:
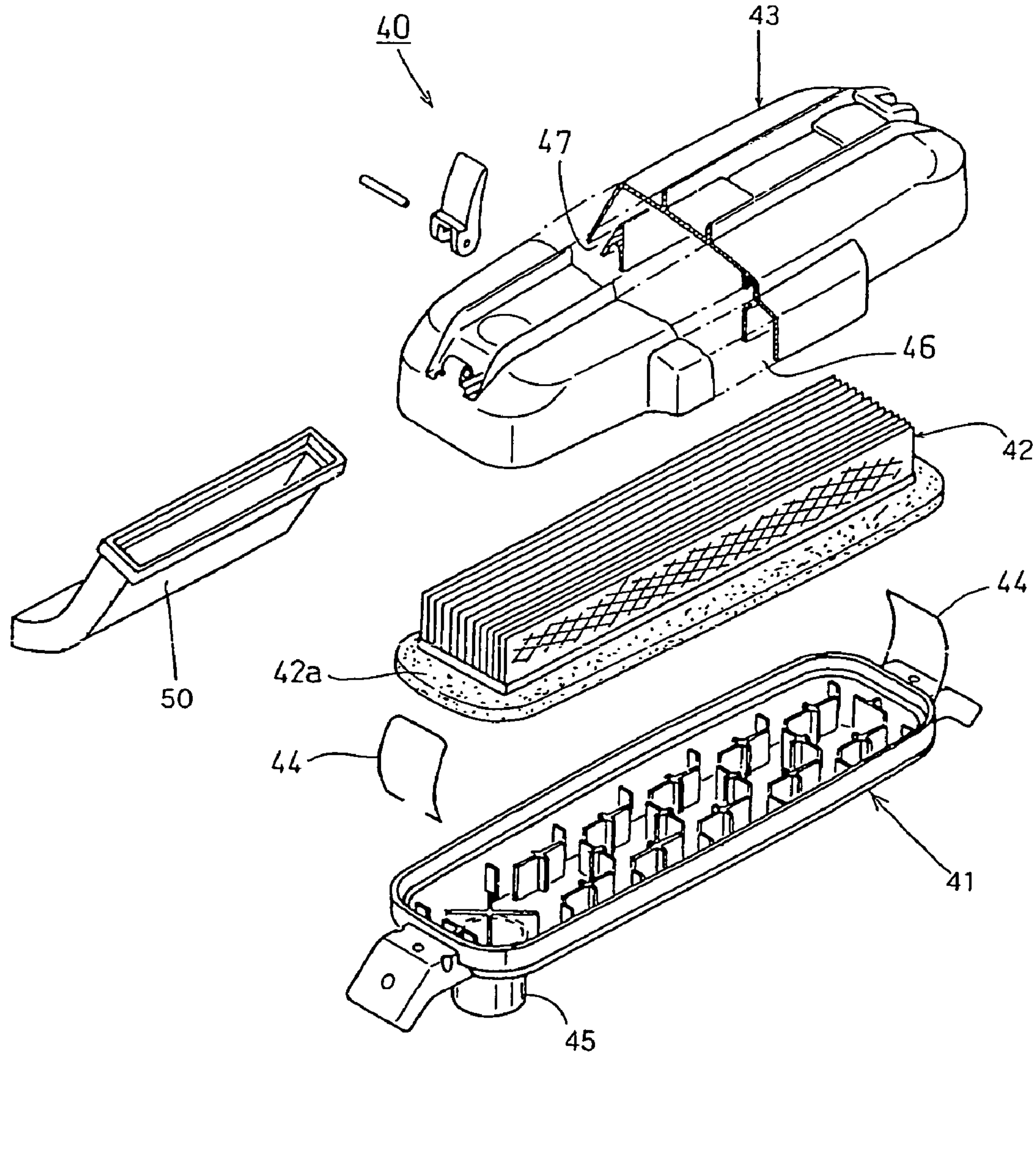
FIG. 3 is an enlarged exploded perspective view illustrating the air cleaner to be employed in the back-pack type air blowing cleaner of FIG. 1.

The air cleaner 40 is of a box-like configuration which is elongated width-wise (from left to right). As seen from FIG. 3 in addition to FIG. 2, the air cleaner 40 is composed of a base case 41 having a tray-like configuration; a filter member 42 having a bellows-like configuration which is adapted to be mounted via a plate-like packing 42*a* on the top opening of the base case 41 so as to seal the top opening of the base case 41; and a cap member 43 which is detachably mounted by means of a hook 44 on the base case 41 so as to cover the filter member. The base case 41 is provided, at a left corner portion of the bottom thereof, with a clean air outlet port 45 for introducing the air cleaned by the filter member 42 into the crank chamber 23 of the internal combustion engine 20. The cap member 43 is provided, on the front side thereof (on the right side in FIG. 2), with a suction port 46 which is directed downward for drawing in external air. The cap member 43 is also provided, on the rear side thereof (on the back-pack frame 12 side), with a discharge port 47 for enabling part of the air that has been drawn through the suction port 46 to be discharged to external atmosphere without permitting the air to pass through the filter member 42.

The back-pack frame 12 is integrally molded by way of blow molding, and constituted by a back-contacting surface 12A which is adapted to be contacted with an operator's back, and an outer surface 12B facing the air blower 30. The inner space surrounded by these back-contacting surface 12A and outer surface 12B is substantially formed of a cavity constituting an air passageway 15. A portion of the outer surface 12B which is located to face the suction port 34 of the air blower 30 (located on the rotational axis O—O) is protruded outward forming a cone-shaped protrusion 13*a*. The outskirts of this cone-shaped protrusion 13*a* is recessed forming an annular groove 13*b*. Along the boundary between the cone-shaped protrusion 13*a* and the annular groove 13*b*, there are disposed a predetermined number of openings which are equidistantly arranged about the rotational axis O—O, thereby rectifying the air flow being introduced into the suction port 34.

A flattened duct 50 is provided so as to connect the exhaust port 47 with the back-pack frame 12 for enabling part of the air that has been drawn into the air cleaner 40 to be fed from the exhaust port 47 to the air passageway 15 formed inside the shouldering frame 12. This flattened duct 50 may be constituted by a plurality of pipes which are arranged side by side.

In the back-pack type air blowing cleaner 10 according to this embodiment which is constructed as described above, when the internal combustion engine 20 is started, external air is permitted to be drawn into the air cleaner 40 from the suction port 46 by the suction force (negative pressure) of the internal combustion engine 20 and of the air blower 30. The air (or most of the air) thus drawn is then cleaned by the filter member 42 and discharged from the cleaned air-discharging port 45 formed to the air cleaner 40, thus enabling the air to be introduced, via the intake duct 48, the carburetor 55 and the intake port 22 of the engine, into the crank chamber 23. The air-fuel mixture thus introduced into the crank chamber 23 is permitted to enter, via the scavenging passageway 28, into the combustion chamber 21 and explosively burnt in the combustion chamber 21 by the ignition thereof by means of the ignition plug 27, the resultant combustion gas (exhaust gas) generated by the explosion of the air-fuel mixture being subsequently discharged from the exhaust gas port into external atmosphere.

Meanwhile, the suction force (negative pressure) to be generated by the rotation of the fan of the air blower 30 and permitted to be transmitted to the air cleaner 40 through the air passageway 15 formed inside the shouldering frame 12 and the duct 50 causes an air flow "A" flowing from the suction port 46 to the discharge port 47 as indicated by a white arrow shown in FIG. 2 to be generated between the outer surface of the filter member 42 and the cap member 43. As a result, part of the air that has been drawn into the air cleaner 40 is prevented from passing through the filter member 42 thus is separate from the cleaned air to be drawn into the internal combustion engine 20 (the crank chamber 23) and is discharged, together with dust adhered to the filter member 42, out of the air cleaner 40 through the exhaust port 47. The air accompanying the dust and discharged into the duct 50 is then attracted, through the air passageway 15 formed inside the shouldering frame 12 and the openings 16, toward the suction port 34 of the air blower 30 by the suction force (negative pressure) of the fan 31 of the air blower 30 and permitted to enter into the volute case 33. After being accelerated and pressurized in the volute case 33, the air is injected out of the working machine through an air injection port 35 and the bent pipe 36.

According to the back-pack type air blowing cleaner 10 of this embodiment as described above, by making use of the suction force (negative pressure) of the fan of the air blower 30, an air flow which is prevented from passing through the filter member 42 is generated in separate from the air to be cleaned by the filter member 42 and drawn into the internal combustion engine 20, and by making use of this air flow, the dust clogging the filter member 42 is removed from the filter member 42, the air accompanying the dust being subsequently drawn into the air blower 30 and then discharged therefrom. As a result, it is possible to retard the progress of clogging of the filter member 42 and hence to prolong the frequency of maintenance, thus making it possible to improve the working efficiency.

While in the foregoing one embodiment of the present invention has been explained in details for the purpose of illustration, it will be understood that the present invention is not limited by the embodiment and that the construction of the device can be varied without departing from the spirit and scope of the invention as claimed in the following claims.

Figure 4:
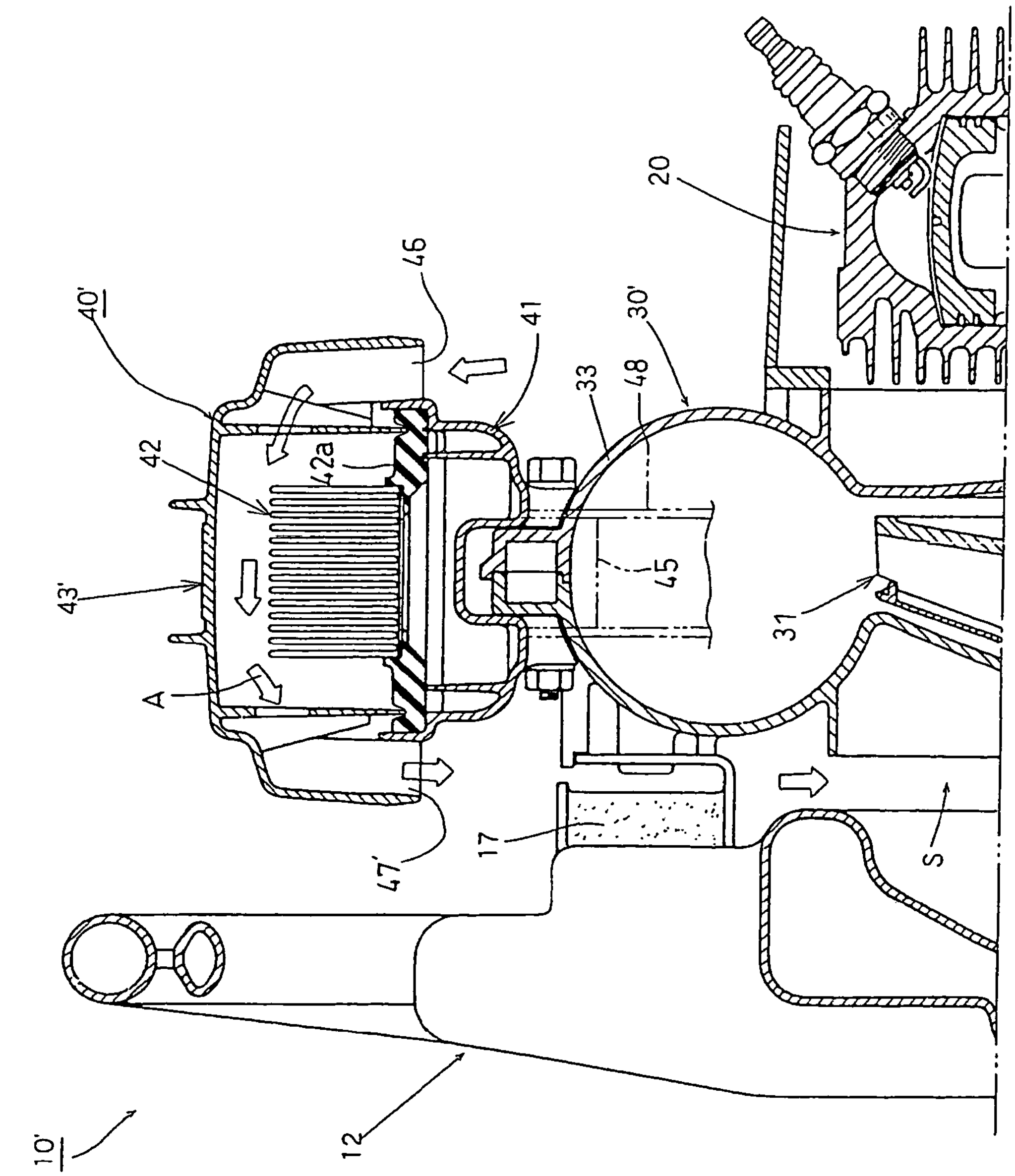
FIG. 4 is a cross-sectional view illustrating a main portion of the back-pack type air blowing cleaner according to another embodiment of the present invention, which represents one of the portable air blowing working machines of the present invention.

For example, the duct 50 as well as the air passageway 15 (the back-pack frame 12) in the above embodiment may not necessarily be employed. Namely, as shown in FIG. 4, the air blowing cleaner may be constructed such that the discharge port 47' of the air cleaner 40' is directed downward and between the shouldering frame 12' and the air blower 30', thereby enabling the suction force (negative pressure) of the air blower 30' to be acted, through the space "S" between the shouldering frame 12' and the air blower 30', on the discharge port 47'. In this case also, an air flow "A" flowing from the suction port 46' to the discharge port 47' as indicated by a white arrow shown in FIG. 4 is caused to generate inside the air cleaner 40'. As a result, part of the air that has been drawn into the air cleaner 40' is prevented from passing through the filter member 42 in separate from the cleaned air to be drawn into the internal combustion engine 20 (the crank chamber 23) and is discharged, together with dust adhered to the outer surface of filter member 42, out of the air cleaner 40 through the exhaust port 47'. The air accompanying the dust is then attracted toward the suction port 34 of the air blower 30' by the suction force (negative pressure) of the fan 31 of the air blower 30' and permitted to enter into the volute case 33, from which the air is injected out of the cleaner.

As will be clear from the above explanation, according to the portable air blowing working machine of the present invention, by making use of the suction force (negative pressure) of the fan of the air blower, an air flow which is prevented from passing through the filter member is generated separate from the air to be cleaned by the filter member and drawn into the internal combustion engine, and by making use of this air flow, the dust clogging the filter member is removed from the filter member. The air accompanying the dust is subsequently drawn into the air blower and then discharged therefrom. As a result, it is possible to slow the progress of clogging of the filter member and hence to prolong the frequency of maintenance, thus making it possible to improve its working efficiency.

What is claimed is:

1. A portable air blowing working machine comprising:

an internal combustion engine having an air cleaner disposed in an air-intake system thereof, and an air blower to be rotationally driven by said internal combustion engine;

said air cleaner comprising a suction port for inhaling external air, a filter member for cleaning air drawn from the suction port to thereby permit cleaned air to be introduced into an intake port of the internal combustion engine, and a discharge port for enabling part of the air that has been drawn from the suction port to be discharged out of said air cleaner without permitting said part of the air to pass through said filter member;

wherein a suction force to be generated by a fan of said air blower is utilized for generating an air flow inside said air cleaner, said air flow being directed to flow from said suction port to said discharge port; and further comprising a back-pack frame for vertically mounting said air blower, wherein an inlet port of the air blower is disposed to face said back-pack frame, said air cleaner is positioned over one of said air blower and said internal combustion engine, and said discharge port of the air cleaner is positioned closer to said back-pack frame to said suction port.

2. The portable air blowing working machine according to claim 1, wherein said back-pack frame is provided therein with an air passageway and with a duct for feeding part of the air that has been drawn into the air cleaner from said discharge port to said air passageway having openings located so as to approximately face said suction port of the air blower.

3. A portable air blowing working machine comprising:

an internal combustion engine having an air cleaner disposed in an air-intake system thereof, and an air blower to be rotationally driven by said internal combustion engine:

said air cleaner comprising a suction port for drawing external air, a filter member for cleaning air drawn from the suction port to thereby permit cleaned air to be introduced into an intake port of the internal combustion engine, and a discharge port for enabling part of the air that has been drawn from the suction port to be discharged out of said air cleaner without permitting said part of the air to pass through said filter member;

wherein a suction force to be generated by a fan of said air blower is utilized for generating an air flow inside said air cleaner, said air flow being directed to flow from said suction port to said discharge port; and wherein the air cleaner further comprises: a base case to which said filter member is secured and to which a cleaned air-discharging port is formed; and a cap member which is detachably mounted on said base case, thereby permitting an air flow to generate in a space between the outer surface of said filter member and the inner surface of said cap member, said air flow being directed to flow from said suction port toward said discharge port.

* * * * *